United States Patent
Wedajo et al.

(10) Patent No.: US 12,420,838 B2
(45) Date of Patent: Sep. 23, 2025

(54) DRIVER ASSISTANCE FOR A MOTOR VEHICLE

(71) Applicant: Valeo Schalter und Sensoren GmbH, Bietigheim-Bissingen (DE)

(72) Inventors: Brouk Wedajo, Bobigny (FR); Thomas Heitzmann, Bobigny (FR)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 296 days.

(21) Appl. No.: 17/922,906

(22) PCT Filed: Apr. 28, 2021

(86) PCT No.: PCT/EP2021/061062
§ 371 (c)(1),
(2) Date: Nov. 2, 2022

(87) PCT Pub. No.: WO2021/224077
PCT Pub. Date: Nov. 11, 2021

(65) Prior Publication Data
US 2023/0166768 A1 Jun. 1, 2023

(30) Foreign Application Priority Data
May 5, 2020 (DE) ...................... 10 2020 112 036.2

(51) Int. Cl.
*B60W 60/00* (2020.01)
*B60W 30/095* (2012.01)
(Continued)

(52) U.S. Cl.
CPC .... *B60W 60/0016* (2020.02); *B60W 30/0956* (2013.01); *B60W 40/02* (2013.01); *B60W 40/10* (2013.01); *B60W 2554/80* (2020.02)

(58) Field of Classification Search
None
See application file for complete search history.

(56) References Cited

U.S. PATENT DOCUMENTS

| 11,402,841 B1* | 8/2022 | Ferguson ............ B60W 40/072 |
| 2016/0063858 A1* | 3/2016 | Schmüdderich .. B60W 30/0956 |
| | | 701/117 |

(Continued)

FOREIGN PATENT DOCUMENTS

| DE | 19845568 A1 | 10/1999 | |
| DE | 102015200215 A1 * | 7/2016 | .......... B60W 30/143 |

(Continued)

OTHER PUBLICATIONS

Adam Houenou, Philippe Bonnifait, Véronique Cherfaoui, Wen Yao, Vehicle Trajectory Prediction based on Motion Model and Maneuver Recognition, 2013 IEEE/RSJ International Conference on Intelligent Robots and Systems (IROS), November 3-7, pp. 4363-4369 (Year: 2013).*

(Continued)

*Primary Examiner* — Khoi H Tran
*Assistant Examiner* — Dairon Estevez
(74) *Attorney, Agent, or Firm* — Osha Bergman Watanabe & Burton LLP

(57) ABSTRACT

A driver-assistance method for a motor vehicle of interest, in which the vehicle of interest detects the third-party vehicles which are present at an initial instant in its environment is disclosed. During a first prediction cycle, an order of priority is assigned to the third-party vehicles which are detected at the initial instant and to the vehicle of interest, corresponding to an order in which the vehicles in the set follow one another in the travel zone starting from a vehicle detected in a position which is furthest ahead of the vehicle of interest. For each selected vehicle in the set, taken in the order of priority, another vehicle in the set is identified which is able to be a primary target vehicle for this selected vehicle. A manoeuvre which is in progress for the selected vehicle is (Continued)

estimated on the basis at least of the identified primary target vehicle.

11 Claims, 2 Drawing Sheets

(51) Int. Cl.
*B60W 40/02* (2006.01)
*B60W 40/10* (2012.01)

(56) References Cited

U.S. PATENT DOCUMENTS

| | | | | |
|---|---|---|---|---|
| 2018/0043890 | A1* | 2/2018 | Keller | B60W 30/08 |
| 2018/0074505 | A1* | 3/2018 | Lv | B60W 60/00272 |
| 2018/0079420 | A1* | 3/2018 | Aine | B60W 30/16 |
| 2018/0154825 | A1* | 6/2018 | Tanaka | G06V 20/58 |
| 2020/0189574 | A1* | 6/2020 | Vignard | G08G 1/166 |
| 2021/0371030 | A1* | 12/2021 | Begleiter | B62J 27/00 |
| 2022/0084397 | A1* | 3/2022 | Tanaka | G08G 1/167 |
| 2023/0019462 | A1* | 1/2023 | Busse | B60W 60/0011 |

FOREIGN PATENT DOCUMENTS

| | | | |
|---|---|---|---|
| DE | 102017200580 A1 * | 7/2018 | |
| DE | 102017206987 A1 | 10/2018 | |

OTHER PUBLICATIONS

Andreas Lawitzky, Daniel Althoff, Christoph F. Passenberg, Georg Tanzmeister, Dirk Wollherr, and Martin Buss, Interactive Scene Prediction for Automotive Applications, 2013 IEEE Intelligent Vehicles Symposium, Jun. 23-26, pp. 1028-1033 (Year: 2013).*

Adam Houenou, Philippe Bonnifait, VÃOronique Cherfaoui, Wen Yao, Vehicle Trajectory Prediction based on Motion Model and Maneuver Recognition, 2013 IEEE/RSJ International Conference on Intelligent Robots and Systems (IROS), Nov. 3-7, pp. 4363-4369 (Year: 2013).*

Andreas Lawitzky, Daniel Althoff, Christoph F. Passenberg, Georg Tanzmeister, Dirk Wollherr, and Martin Buss, Interactive Scene Prediction for Automotive Applications, 2013 IEEE Intelligent Vehicles Symposium, June 23-26, pp. 1028-1033 (Year: 2013).*

Adam Houenou, Philippe Bonnifait, VÃ©ronique Cherfaoui, Wen Yao, Vehicle Trajectory Prediction based on Motion Model and Maneuver Recognition, 2013 IEEE/RSJ International Conference on Intelligent Robots and Systems (IROS), Nov. 3-7, pp. 4363-4369 (Year: 2013).*

Lefèvre et al.; "A survey on motion prediction and risk assessment for intelligent vehicles;" Robomech Journal; vol. 1; Jul. 23, 2014; Retrieved from the Internet: URL: http://www.robomechjournal.com/content/1/1/1 (14 pages).

Search Report issued in corresponding German Application No. 10 2020 112 036.2, dated Apr. 20, 2021 (4 pages).

* cited by examiner

DRIVER ASSISTANCE FOR A MOTOR VEHICLE

TECHNICAL FIELD

The present invention generally relates to the field of motor vehicles, and more specifically to driver assistance for a motor vehicle.

TECHNOLOGICAL BACKGROUND

In order to increase road safety, certain motor vehicles, referred to as semi-autonomous motor vehicles, are equipped with partial automation systems or advanced driver-assistance systems (known by the acronym ADAS), in particular with systems carrying out, instead of the driver, the sideways control and/or the lengthways control of the vehicle, or at the very least alerting the driver of a potentially dangerous situation in order to make it possible for him/her to react in time. Provision is also made for making motor vehicles completely autonomous, that is to say without a driver.

In order to make it possible for an autonomous or semi-autonomous vehicle (called a "vehicle of interest" below) to detect dangerous situations and to react accordingly in order to avoid or reduce the risk of accidents, the on-board driver-assistance system on this vehicle must be capable not only of detecting all the dynamic objects (called "third-party vehicles" below) which are present in the immediate environment of the vehicle, such as other motor vehicles (cars, lorries, motorcycles), but also of predicting the future motion of these third-party vehicles.

As described, for example, in the document entitled "A survey on motion prediction and risk assessment for intelligent vehicles" (Lefévre et al., Robomech Journal 2014.1:1 http://www.robometechjournal.com/content/1/1/1), known trajectory prediction methods are based on a motion model chosen from among the following three types of motion models:
  physics-based motion models;
  manoeuvre-based motion models; and
  interaction-sensitive motion models.

Physics-based motion models are the simplest because they consider that the future motion of a vehicle depends only on the laws of physics. These models are highly dependent on the accuracy of the on-board sensors on the vehicle of interest and assume that the third-party vehicle does not change state (speed or direction). Consequently, these models do not make it possible to reliably predict the trajectory of a third-party vehicle for a long-term prediction, for example beyond two seconds.

Manoeuvre-based motion models are a little more sophisticated than physics-based motion models because they also take into account the manoeuvre which the driver of a third-party vehicle intends to perform. Nevertheless, the vehicle of interest and the third-party vehicles the manoeuvres of which are estimated are considered to be moving independently of one another, which may lead to erroneous interpretations of certain road situations and affect the risk assessment for the vehicle of interest.

Interaction-sensitive motion models are currently the most advanced because they take into account the fact that the motion of a vehicle may be influenced by the motion of the other vehicles which are present in the road scene. Most of these models use dynamic Bayesian networks which make it possible to consider pairwise dependencies between several moving vehicles. These models make reliable and longer-term projections possible, but are incompatible with the need to assess risk in real time for the vehicle of interest because they require significant computing time resources to be able to estimate, for all the possible pairs of vehicles, all the potential trajectories of the vehicles.

SUMMARY OF THE INVENTION

One aim of the present invention is to overcome the limitations of the prior art by proposing, in particular, a simplified method making it possible to predict, reliably and inexpensively in terms of computing time, at least one future position of each vehicle which is present in a road scene in which the vehicle of interest is moving.

Another aim of the invention is to use this simplified method to quickly predict the trajectory of a plurality of vehicles which are moving in the environment of the third-party vehicle over a longer prediction time than the methods using a physics-based motion model.

Consequently, one subject of the present invention is a driver-assistance method for a motor vehicle of interest, comprising:

a detection step during which an on-board system on said motor vehicle of interest detects a plurality of third-party vehicles which are present at an initial instant in the environment of the motor vehicle of interest, in a multi-lane travel zone;

a first cycle of prediction, by said on-board system, of a first relative position and of a first relative speed of each vehicle $O_k$ in said set, in said first frame of reference and for a first prediction instant following said initial instant, said first prediction cycle comprising:

a step of storing, in a database of said on-board system, initial data for each vehicle $O_k$ in a set of K vehicles comprising the third-party vehicles which are detected at the initial instant and the vehicle of interest, said initial data comprising information relating to the current traffic lane, a current relative position and a current relative speed of each vehicle $O_k$ in said set at the initial instant and in a first frame of reference linked to the vehicle of interest;

a sorting step during which an order of priority is assigned to the K vehicles $O_k$ in the set, the order of priority being determined in accordance with the position and with the traffic lane of each vehicle $O_k$ in the set which are stored in the database, and corresponding to an order in which the vehicles $O_k$ in the set follow one another in said travel zone starting from a vehicle detected in a position which is furthest ahead of the vehicle of interest;

a step of selecting each vehicle $O_k$ in said set in the predetermined order of priority, and, for each selected vehicle $O^*_k$ in said set:

a sub-step of identifying another vehicle in said set which is able to be a primary target vehicle for the selected vehicle $O^*_k$;

a sub-step of estimating a manoeuvre which is in progress or about to be performed by the selected vehicle $O^*_k$ on the basis at least of the identified primary target vehicle, of information relating only to the selected vehicle $O^*_k$ and of information relating to the current environment of the selected vehicle $O^*_k$;

a sub-step of estimating the movement of the selected vehicle $O^*_k$ between the initial instant and said first prediction instant on the basis of the manoeuvre which is estimated for the selected vehicle $O^*_k$;

the first relative position and the first relative speed of the selected vehicle $O^*_k$ for said first prediction instant being predicted on the basis of the estimated movement.

In one possible embodiment, the sub-steps are carried out on the basis of position and speed data which are transformed into a two-dimensional frame of reference which is linked to the selected vehicle $O^*_k$.

The estimated manoeuvre is preferably chosen from among a predefined set of possible manoeuvres. The predefined set of possible manoeuvres for a selected vehicle $O^*_k$ may comprise: keeping in its current lane; it changing lane to the left lane; it changing lane to the right lane; it stopping in its current lane.

In one possible embodiment, the sub-step of identifying a potential primary target vehicle for the selected vehicle $O^*_k$ comprises searching for a vehicle in the set located in the same lane, ahead of and closest to the selected vehicle $O^*_k$.

In one possible embodiment, the information relating only to the selected vehicle $O^*_k$ comprises, for example, its sideways movement, and/or an on or off state of one of its indicators, and/or a history of its stored positions.

In one possible embodiment, the information relating to the current environment of the selected vehicle $O^*_k$ comprises the type of marking lines of the traffic lane in which the selected vehicle $O^*_k$ is located and/or the occupancy of the traffic lanes which are adjacent to the current traffic lane of the selected vehicle $O^*_k$, and/or the current speed limit assigned to the traffic lane.

In one possible embodiment, the method comprises a second cycle of prediction, by said on-board system, of a second relative position $\{X; Y; \theta\}_{k,2}$ and of a second relative speed $\{V_X; V_Y; \dot{\theta}\}_{k,2}$ of each vehicle $O_k$ in said set, in said first frame of reference and for a second prediction instant following said first prediction instant, the second prediction cycle comprising:
- a first step of updating the database, in which the initial relative position and relative speed data are replaced by the first relative position $\{X; Y; \theta\}_{k,1}$ and the first relative speed $\{V_X; V_Y; \dot{\theta}\}_{k,1}$ which are predicted in the first prediction cycle for each vehicle $O_k$ in the set; and
- the sorting step, the selection step and the sub-steps of the first prediction cycle, in which the initial instant has been replaced by the first prediction instant, and the first prediction instant has been replaced by the second prediction instant.

The method may comprise a number N, which is greater than 2, of successive prediction cycles, each $n^{th}$ prediction cycle making it possible to predict an $n^{th}$ relative position $\{X; Y; \theta\}_{k,n}$ and an $n^{th}$ relative speed $\{V_X; V_Y; \dot{\theta}\}_{k,n}$ of each vehicle $O_k$ in said set, in said first frame of reference and for an $n^{th}$ prediction instant following a preceding prediction instant, each $n^{th}$ prediction cycle comprising:
- a step of updating the database, in which the relative position and relative speed data are replaced by the relative position and the relative speed which are predicted in the preceding prediction cycle for each vehicle $O_k$ in the set; and
- the sorting step, the selection step and the sub-steps of the first prediction cycle, in which the initial instant has been replaced by the preceding prediction instant, and the first prediction instant has been replaced by the $n^{th}$ prediction instant.

The successive prediction instants are preferably separated by a constant time step.

In one possible embodiment, N is equal to 33 and the constant time step is equal to 200 ms.

Another subject of the invention is an on-board driver-assistance system on a vehicle of interest, configured to implement the method according to the invention.

BRIEF DESCRIPTION OF THE DRAWINGS

The invention will be better understood in view of the following description, given with reference to the appended figures, in which.

DESCRIPTION OF EMBODIMENT(S)

In order to give a concrete idea, the invention will now be described in the context of the non-limiting example of the road scene shown schematically in plan view in FIG. 1.

Figure 1:
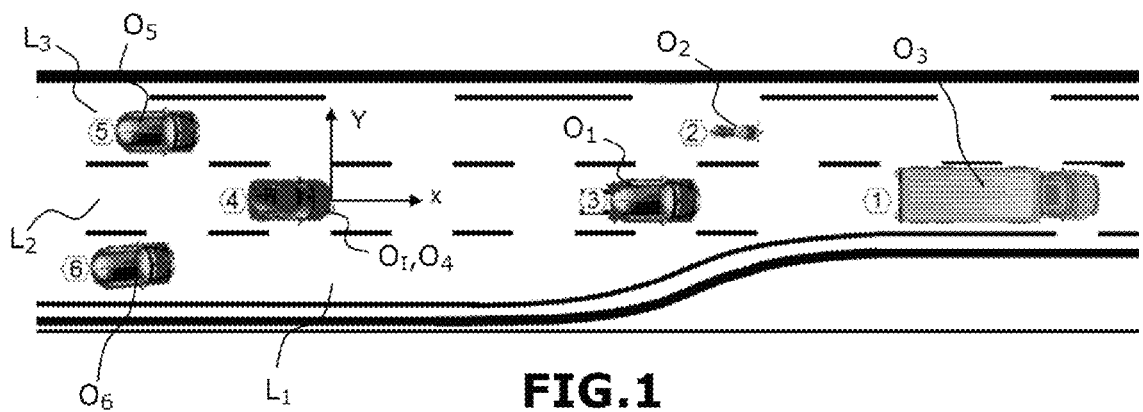
FIG. 1 schematically illustrates, in plan view, an example of a road scene serving to illustrate the principles of the invention.

In this FIG. 1, a vehicle of interest $O_I$, having an advanced driver-assistance system (which is not shown) which is in accordance with the invention, is moving in a travel zone comprising three traffic lanes $L_1$, $L_2$, $L_3$. Five other vehicles $O_1$ to $O_3$ and $O_5$, $O_6$ are also moving in the environment of the vehicle of interest $O_I$. For the sake of simplicity, it is non-limitingly assumed that the travel zone corresponds to a portion of motorway with two lanes $L_2$, $L_3$, the lane $L_1$ corresponding to a feeder road, and that all the vehicles are travelling in the same direction (from left to right in FIG. 1), according to the French highway code (overtaking on the left and speed limited to 130 km/h). In the non-limiting example, the third-party vehicles $O_1$, $O_5$ and $O_6$ are all motor vehicles, the third-party vehicle $O_2$ is a motorcycle, and the third-party vehicle $O_3$ is a lorry. Furthermore, in this example, the lorry $O_3$ is stationary, and the brake lights of the third-party vehicle $O_1$ are on because its driver is braking. The nature of the third-party vehicles which are present in the environment of the vehicle of interest has no impact on the principles of the present invention. In other words, a third-party vehicle may be either a conventional vehicle, a semi-autonomous vehicle or an autonomous vehicle.

It is assumed below that the vehicle of interest $O_I$ is equipped:
- with various sensors (which are not shown) of different natures (for example, image sensors, Radar, Lidar) making it possible for it to detect, on the one hand, the third-party vehicles $O_1$ to $O_3$ and $O_5$, $O_6$ which are present in its environment, and, on the other hand, the information relating to the geometry of the road scene (in particular the marking lines, the traffic signs, etc.);
- with an ADAS (which is not shown) making it possible for it to process the information detected and to take appropriate decisions (alerts to the driver of the vehicle of interest $O_I$ and/or sideways and lengthways control of the vehicle of interest $O_I$).

A complete driver-assistance method which is in accordance with the invention consists in detecting the presence of the various third-party vehicles at an initial instant $t_0$ and in predicting, for the vehicle of interest $O_I$ and for all the third-party vehicles the presence of which was detected at the initial instant $t_0$, the future trajectory (or predicted trajectory) over a predetermined total prediction period.

Below, the following notations will be used:

$O_k$ represents a vehicle in a set of K vehicles comprising the vehicle of interest $O_I$ and all the third-party vehicles detected at the initial instant $t_0$. Thus, in the example of FIG. 1, the set comprises in total six vehicles, namely the detected third-party vehicles $O_1$ to $O_3$ and $O_5$, $O_6$, and the vehicle of interest $O_I$, which will interchangeably bear the reference $O_I$ or $O_4$ below;

$P_k(0)$ represents the point associated with a vehicle $O_k$ in the set of K vehicles at the initial detection instant $t_0$, this point $P_k(0)$ being conventionally associated with:

the current relative position $\{X; Y; \theta\}_{k,0}$ of the vehicle $O_k$ in a first two-dimensional frame of reference linked to the vehicle of interest $O_I$ (see FIG. 1), where $\theta$ represents the relative orientation, in radians, of the vehicle $O_k$ with respect to the first frame of reference $O_I$;

the current relative speed $\{V_X, V_Y, \dot{\theta}\}_{k,0}$ of the vehicle $O_k$ in this same first two-dimensional frame of reference linked to the vehicle of interest $O_I$, where represents the variation, in radians/seconds, in the relative orientation of the vehicle $O_k$ with respect to the first frame of reference $O_I$;

$P_k(n)$ represents a point in the predicted trajectory for a vehicle $O_k$ in the set of K vehicles, at a prediction instant $t_k$ such that $$t_k = t_0 + n\Delta t$$

this point $P_k(n)$ being also conventionally associated with:

the relative position $\{X; Y; \theta\}_{k,n}$ of the vehicle $O_k$ predicted at the prediction instant $t_k$ in the first frame of reference linked to the vehicle of interest $O_I$;

the relative speed $\{V_X, V_Y, \dot{\theta}\}_{k,n}$ of the vehicle $O_k$ predicted at the prediction instant $t_k$ in this same first frame of reference linked to the vehicle of interest $O_I$.

A predicted trajectory for each vehicle $O_k$ taken from the set comprising the detected third-party vehicles and the vehicle of interest is thus formed, starting from an initial point $P_k(0)$ measured at the initial instant $t_0$, by a succession of N points $P_k(n)$ estimated successively with a time step $\Delta t$, in which n varies from 1 to N.

Figure 2:
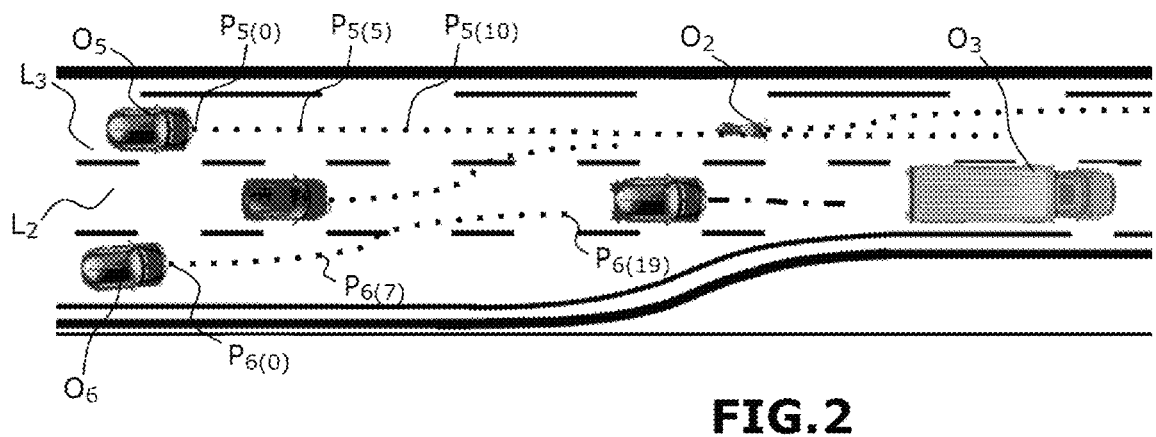
FIG. 2 schematically shows trajectories predicted by a method in accordance with the invention for the example of the road scene of FIG. 1.

In an example of an implementation, the time step $\Delta t$ is constant between each successive point of a predicted trajectory. By way of example, a time step $\Delta t$ which is equal to 200 ms is chosen, and the number N is set equal to 33, this making it possible to make a trajectory prediction for each vehicle $O_k$ over a total prediction time of 7 seconds counting from the initial instant $t_0$. FIG. 2 illustrates an example of the portions of the various predicted trajectories for the various vehicles $O_k$ in accordance with the principles of the invention, which will be detailed below. For example, the predicted trajectory for the vehicle $O_5$ comprises the initial point starting from the point $P_5(0)$, and a succession of predicted points such as the point $P_5(5)$ at the prediction instant $t_5$ and the point $P_5(10)$ at the prediction instant $t_{10}$, and the predicted trajectory for the vehicle $O_6$ comprises the initial point starting from the point $P_6(0)$, and a succession of predicted points such as the point $P_6(7)$ at the prediction instant $t_7$ and the point $P_5(19)$ at the prediction instant $t_{19}$.

Figure 3:
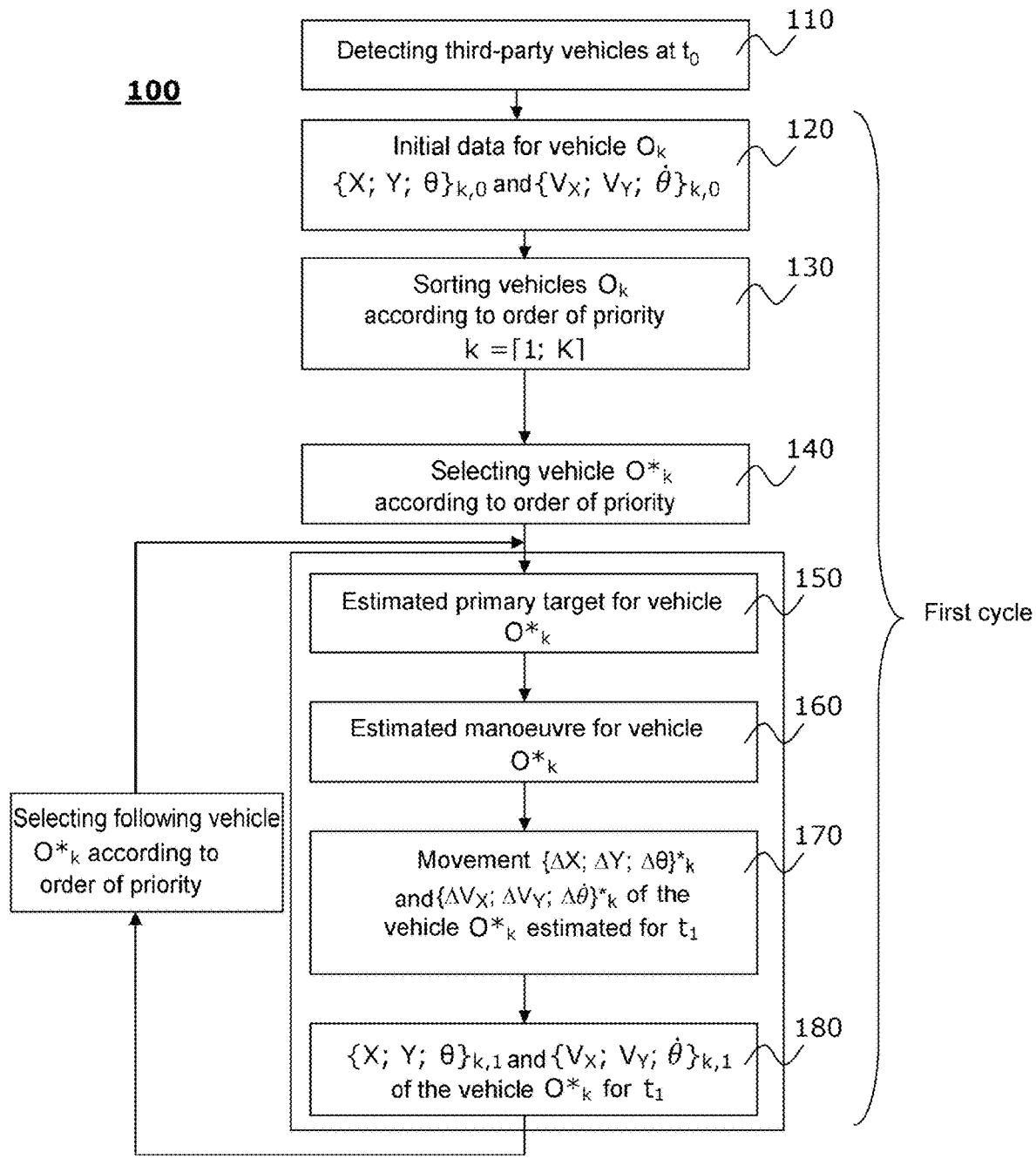
FIG. 3 shows steps which are able to be implemented according to a first embodiment of a detection method which is in accordance with the invention.

With reference to FIG. 3, a method 100 which is in accordance with the invention comprising at least one first prediction cycle making it possible for the on-board system on the vehicle of interest $O_I$ ($O_4$) to predict, for each vehicle $O_k$, the first point $P_k(1)$ on the basis of the point $P_k(0)$ will now be described.

The method 100 comprises an initial detection step 110 during which the on-board system on the motor vehicle of interest $O_I$ detects a plurality of third-party vehicles which are present at the initial instant $t_0$ in the environment of the motor vehicle of interest $O_I$, in a multi-lane travel zone. In the example of FIGS. 1 and 2, it is thus assumed that the on-board system on the vehicle of interest $O_I$ detects the presence, at the initial instant $t_0$, of the third-party vehicles $O_1$ to $O_3$, $O_5$ and $O_6$.

In accordance with the notations indicated above, the aim of this first prediction cycle is to make it possible for the on-board system on the vehicle of interest $O_I$ to predict the parameters associated with the first point $P_k(1)$, namely the first relative position $\{X; Y; \theta\}_{k,1}$ and the first relative speed $\{V_X; V_Y, \dot{\theta}\}_{k,0}$ of each vehicle $O_k$, in the frame of reference associated with the vehicle of interest and for a first prediction instant $t_1$ following the initial instant $t_0$.

For this purpose, the first prediction cycle begins with a step 120 of storing, in a database of the on-board system, initial data for each vehicle $O_k$ in a set of K vehicles comprising the third-party vehicles detected at the initial instant $t_0$ and the vehicle of interest $O_I$. The initial data comprise:

on the one hand, the parameters indicated above associated with each initial point $P_k(0)$, namely a current relative position $\{X; Y; \theta\}_{k,0}$ and a current relative speed $\{V_X; V_Y, \dot{\theta}\}_{k,0}$ of each vehicle $O_k$ in the set at the initial instant $t_0$ and expressed in the first frame of reference linked to the vehicle of interest $O_I$;

on the other hand, the current traffic lane of each vehicle $O_k$ at the initial instant $t_0$, as estimated by the on-board system on the vehicle of interest $O_I$ (conventional estimation consisting, for example, in identifying the traffic lane for which the sideways distance along the Y axis calculated between the centre of the vehicle of interest $O_I$ and the centre of each traffic lane $L_1$, $L_2$ and $L_3$ is minimal).

Table 1 below gives an example of the contents of the database at the detection instant $t_0$ for the road scene shown in FIGS. 1 and 2:

TABLE 1

Initial working database

| Vehicle | $O_1$ | $O_2$ | $O_3$ | $O_I = O_4$ | $O_5$ | $O_6$ |
|---|---|---|---|---|---|---|
| Point at $t_0$ | $P_1(0)$ | $P_2(0)$ | $P_3(0)$ | $P_4(0)$ | $P_5(0)$ | $P_6(0)$ |
|  | k = 1 | k = 2 | k = 3 | k = 4 | k = 5 | k = 6 |
| $\{X; Y; \theta\}_{k,0}$ | {60; 0; 0} | {70; 3.5; 0} | {100; 0; 0} | {0; 0; 0} | {−20; 3.5; 0} | {−25; −3.5; 0} |
| $\{V_X; V_Y; \dot{\theta}\}_{k,0}$ | {−16.1; 0; 0} | {5.5; 0; 0} | {−36.1; 0; 0} | {0; 0; 0} | {0.2; 0; 0} | {−0.5; +0.8; 0} |
| Lane No. | 2 | 3 | 2 | 2 | 3 | 1 |

According to an important feature of the invention, the first prediction cycle continues with a sorting step 130 during which an order of priority is assigned to the K vehicles $O_k$ in the set, the order of priority being determined in accordance with the position and with the traffic lane of each vehicle $O_k$ in the set which are stored in the database, and corresponding to an order in which the vehicles $O_k$ in the set follow one another in the travel zone starting from a vehicle detected in the position furthest ahead of the vehicle of interest $O_I$. In the case of the road scene given by way of example in FIGS. 1 and 2, and as indicated by the numbers placed at the rear of each vehicle, it is the lorry $O_3$ which appears as the first vehicle to be considered, followed by the motorcycle $O_2$, then by the vehicle $O_1$, by the vehicle of interest $O_4$, by the vehicle $O_5$ and finally by the vehicle $O_6$.

Table 2 below illustrates Table 1, the columns of which have been reordered according to the order of priority corresponding to the example of a road scene in FIGS. 1 and 2:

TABLE 2

Initial working database reordered according to order of priority

| Vehicle | $O_3$ | $O_2$ | $O_1$ | $O_I = O_4$ | $O_5$ | $O_6$ |
|---|---|---|---|---|---|---|
| Point at $t_0$ | $P_3(0)$ | $P_2(0)$ | $P_1(0)$ | $P_4(0)$ | $P_5(0)$ | $P_6(0)$ |
|  | k = 3 | k = 2 | k = 1 | k = 4 | k = 5 | k = 6 |
| $\{X; Y; \theta\}_{k, 0}$ | {100; 0; 0} | {70; 3.5; 0} | {60; 0; 0} | {0; 0; 0} | {−20; 3.5; 0} | {−25; −3.5; 0} |
| $\{V_X; V_Y; \dot{\theta}\}_{k, 0}$ | {−36.1; 0; 0} | {5.5; 0; 0} | {−16.1; 0; 0} | {0; 0; 0} | {0.2; 0; 0} | {−0.5; +0.8; 0} |
| Lane No. | 2 | 3 | 2 | 2 | 3 | 1 |
| Order of priority | 1 | 2 | 3 | 4 | 5 | 6 |

The first prediction cycle continues with particular prediction processing being performed, by the on-board system of the vehicle of interest, on each of the vehicles $O_k$ in the set (including the vehicle of interest $O_I$). More specifically, the on-board system on the vehicle of interest $O_I$ selects (step 140) each vehicle $O_k$ in the order of priority assigned in step 130. Each vehicle selected in the order of priority is then denoted $O^*_k$. In the example of the road scene shown in FIGS. 1 and 2, the particular prediction processing will thus firstly be performed for the selected vehicle $O_3^*$ corresponding to the lorry $O_3$, then to the selected vehicle $O_2^*$ corresponding to the motorcycle $O_2$ and so on until the last vehicle $O_6^*$ from Table 2, corresponding to the vehicle $O_6$, is selected.

The particular processing performed on each selected vehicle $O^*_k$ essentially comprises the following sub-steps, which will be detailed more fully below:

a sub-step 150 of identifying another vehicle in said set which is able to be a primary target vehicle for the selected vehicle $O^*_k$;

a sub-step 160 of estimating a manoeuvre which is in progress or about to be performed by the selected vehicle $O^*_k$ on the basis at least of the primary target vehicle identified in the sub-step 150, of information relating only to the selected vehicle $O^*_k$ and of information relating to the current environment of the selected vehicle $O^*_k$; and a sub-step 170 of estimating the movement of the selected vehicle $O^*_k$ between the initial instant to and the first prediction instant $t_1$, on the basis of the manoeuvre which is estimated in the sub-step 160 for the selected vehicle $O^*_k$.

In order to simplify the calculations, the sub-steps 150, 160 and 170 are preferably carried out, not on the basis of data expressed in the first frame of reference linked to the vehicle of interest $O_I$ (except in the case where the processing relates to the vehicle $O_I$ as selected vehicle), but of data transformed into a two-dimensional frame of reference linked to the selected vehicle $O^*_k$. All the prediction processing is thus performed as if the on-board system on the vehicle of interest $O_I$ was in fact on board the selected vehicle $O^*_k$. The system must thus, for each prediction processing associated with a selected vehicle $O^*_k$, transform beforehand (by rotation and translation) all the data stored in the reordered initial database into the frame of reference associated with the selected vehicle $O^*_k$, and store this information in a temporary database which is representative of the selected vehicle $O^*_k$.

By way of examples, Table 3 below gives the temporary database obtained when the selected vehicle $O^*_k$ for the processing according to the sub-steps 150 to 170 corresponds to the lorry $O_3$ (first processing according to the order of priority), and Table 4 below gives the temporary database obtained when the selected vehicle $O^*_k$ for the processing according to the sub-steps 150 to 170 corresponds to the vehicle $O_3$ (second processing according to the order of priority):

TABLE 3

Temporary database vehicle selected $O_3^* = O_3$

| Vehicle | $O_3^* = O_3$ | $O_2$ | $O_1$ | $O_I = O_4$ | $O_5$ | $O_6$ |
|---|---|---|---|---|---|---|
| $\{X; Y; \theta\}^*_{k, 0}$ | {0; 0; 0} | {−30; 3.5; 0} | {−40; 0; 0} | {−100; 0; 0} | {−120; 3.5; 0} | {−125; −3.5; 0} |
| $\{V_X; V_Y; \dot{\theta}\}^*_{k, 0}$ | {0; 0; 0} | {41.6; 0; 0} | {20; 0; 0} | {36.1; 0; 0} | {36.3; 0; 0} | {35.6; 0; 0} |
| Lane No. | 2 | 3 | 2 | 2 | 3 | 1 |

TABLE 4

Temporary database vehicle selected $O_2^* = O_2$

| Vehicle | $O_3$ | $O^* = O_2$ | $O_1$ | $O_I = O_4$ | $O_5$ | $O_6$ |
|---|---|---|---|---|---|---|
| $\{X; Y; \theta\}^*_{k, 0}$ | {30; −3.5; 0} | {0; 0; 0} | {−10; −3.5; 0} | {−70; −3.5; 0} | {−90; 0; 0} | {−95; 0; 0} |
| $\{V_X; V_Y; \dot{\theta}\}^*_{k, 0}$ | {−41.6; 0; 0} | {0; 0; 0} | {−21.6; 0; 0} | {−5.5; 0; 0} | {−5.3; 0; 0} | {−6; +0.8; 0} |
| Lane No. | 2 | 3 | 2 | 2 | 3 | 1 |

In Tables 3 and 4 above:

$\{X; Y; \theta\}^*_{k,0}$ represents the current relative position of each vehicle $O_k$ after being transformed into a two-dimensional frame of reference linked to the selected vehicle $O^*_k$;

$\{V_X, V_Y, \dot{\theta}\}^*_{k,0}$ represents the current relative speed of each vehicle $O_k$ after being transformed into the two-dimensional frame of reference linked to the vehicle of interest $O^*_k$.

On the basis of the transformed information stored in the temporary database which is representative of a selected vehicle, the on-board system will be able to identify (sub-step 150 mentioned above) whether there exists, in the set of K vehicles, a primary target for the selected vehicle $O^*_k$. Such a potential primary target is conventionally identified by the on-board system of the vehicle of interest by searching for a vehicle in the set which, according to the transformed information stored in the temporary database which is representative of the selected vehicle $O^*_k$, is located in the same lane, ahead of and closest to the selected vehicle $O^*_k$. This search is conventionally performed by searching for the vehicle for which the estimated time to collision (or TTC) with the selected vehicle $O^*_k$ is the smallest.

In the example of a road scene shown in FIGS. 1 and 2, no primary target will be detected during the sub-step 150 carried out for the selected vehicle corresponding to the lorry $O_3$, to the motorcycle $O_2$ or to the vehicle $O_6$, because no vehicle is located directly ahead of and in the same lane as these vehicles. On the other hand, the primary target which will be detected at the end of the sub-step 150 will be:

the lorry $O_3$ when the vehicle selected for processing corresponds to the vehicle $O_1$;

the vehicle $O_1$ when the vehicle selected for processing corresponds to the vehicle of interest $O_4$; and the motorcycle $O_2$ when the vehicle selected for processing corresponds to the vehicle of interest $O_5$.

The on-board system will then be able to estimate (sub-step 160 mentioned above) the manoeuvre which is in progress or about to be performed by the selected vehicle $O^*_k$ using, in particular:

the primary target (or the absence of primary target) identified in the previous sub-step 150 for the selected vehicle $O^*_k$;

information relating only to the selected vehicle $O^*_k$, for example:
  its sideways movement, and/or
  the on or off state of one of its indicators, and/or
  a history of its stored positions;

information relating to the current environment of the selected vehicle $O^*_k$, such as:
  the type of marking lines (dotted or continuous) of the traffic lane in which the selected vehicle $O^*_k$ is located; and/or
  the occupancy of the traffic lanes which are adjacent to the current traffic lane of the selected vehicle $O^*_k$; and/or the current speed limit assigned to the traffic lane (originating, for example, from a GPS system or from a digital map pre-recorded in the on-board system, or extracted from the image of a traffic sign captured by an on-board camera on the vehicle of interest).

The manoeuvre which is predicted for the selected vehicle $O^*_k$ preferably forms part of a predefined set of possible manoeuvres, such as:

$KL_k$, or keeping in its current lane: The selected vehicle $O^*_k$ continues to drive in its current travel lane;

$LLC_k$, or changing lane to the left lane: The selected vehicle $O^*_k$ will move to the adjacent lane to the left of its current travel lane;

$RLC_k$, or changing lane to the right lane: The selected vehicle $O^*_k$ will move to the adjacent lane to the right of its current travel lane;

$S_k$, or stopping in current lane: The selected vehicle $O^*_k$ will stop in its current travel lane.

The preceding manoeuvres are not limiting. Other manoeuvres better suited to other road configurations (for example, arriving at a roundabout or at a junction) may be envisaged without departing from the scope of the present invention.

Table 5 below gives, in particular, the primary targets, predicted manoeuvres, current lane, and target lane which are obtained for the various vehicles in the road scene illustrated in FIGS. 1 and 2 at the end of the sub-step 160 for the prediction instant $t_1$:

TABLE 5

| Selected vehicle $O^*_k$ | Primary target | Predicted manoeuvre | Current lane | Target lane |
|---|---|---|---|---|
| $O_1$ | $O_3$ | $KL_1$ | $L_2$ | $L_2$ |
| $O_2$ | ∅ | $KL_2$ | $L_3$ | $L_3$ |
| $O_3$ | ∅ | $S_3$ | $L_2$ | $L_2$ |
| $O_4 = O_I$ | $O_1$ | $KL_4$ | $L_2$ | $L_2$ |
| $O_5$ | $O_2$ | $KL_5$ | $L_3$ | $L_3$ |
| $O_6$ | ∅ | $LLC_6$ | $L_1$ | $L_2$ |

The on-board system may then estimate (sub-step 170), in the frame of reference of the selected vehicle $O^*_k$, the predicted movement in terms of position and of speed for the selected vehicle $O^*_k$ between the initial instant $t_0$ and the first prediction instant $t_1$ on the basis of the primary target (or the absence of primary target) and the estimated manoeuvre for the selected vehicle $O^*_k$. Table 6 below gives an example of the movement thus estimated when the previous prediction processing has been performed, according to the order of priority, on all the vehicles in the set, selected in turn:

TABLE 6

Movement of each vehicle in its own frame of reference

| Vehicle | $O_3$ | $O_2$ | $O_1$ | $O_I = O_4$ | $O_5$ | $O_6$ |
|---|---|---|---|---|---|---|
| $\{\Delta X; \Delta Y; \Delta\theta\}*_k$ | {0; 0; 0} | {1.1; 0; 0} | ... | {1; 0; 0} | ... | ... |
| $\{\Delta V_X; \Delta V_Y; \Delta\dot\theta\}*_k$ | {0; 0; 0} | {0; 0; 0} | ... | {0; 0; 0} | ... | ... |

The preceding results are then transformed again (translation and rotation) in order to be expressed in the frame of reference linked to the vehicle of interest $O_I$, so that it is possible, on the basis of the calculated movement, to give the predicted position and speed for the prediction instant $t_1$ for each vehicle (step 180 FIG. 3), this position and this speed being expressed in the frame of reference of the vehicle of interest $O_I$. For example, for the lorry $O_3$, the relative position $\{X; Y; \theta\}_{3,1}$ and speed $\{V_X, V_Y, \dot\theta\}_{3,1}$ which are obtained at the end of the first prediction cycle, associated with the point $P_3(1)$, originate from the following calculations:

$$\begin{pmatrix}\Delta X\\ \Delta Y\end{pmatrix} = \begin{pmatrix}\cos(\theta i) & -\sin(\theta i)\\ \sin(\theta i) & \cos(\theta i)\end{pmatrix}\begin{pmatrix}\Delta X\\ \Delta Y\end{pmatrix}_{*3}$$

$$\Delta\theta = \Delta\theta_{*3} + \theta i$$

$$\begin{pmatrix}X\\ Y\end{pmatrix}_{3,1} = \begin{pmatrix}X\\ Y\end{pmatrix}_{3,0} + \begin{pmatrix}\cos(\Delta\theta) & -\sin(\Delta\theta)\\ \sin(\Delta\theta) & \cos(\Delta\theta)\end{pmatrix}\begin{pmatrix}\Delta X\\ \Delta Y\end{pmatrix}$$

$$\theta_{3,1} = \theta_{3,0} + \Delta\theta$$

$$\begin{pmatrix}Vx\\ Vy\end{pmatrix}_{3,1} = \begin{pmatrix}Vx\\ Vy\end{pmatrix}_{3,0} + \begin{pmatrix}\cos(\Delta\dot\theta) & -\sin(\Delta\dot\theta)\\ \sin(\Delta\dot\theta) & \cos(\Delta\dot\theta)\end{pmatrix}\begin{pmatrix}\Delta Vx\\ \Delta Vy\end{pmatrix}$$

$$\dot\theta_{3,1} = \dot\theta_{3,0} + \Delta\dot\theta$$

A second prediction cycle (which is not shown), which is similar to the first prediction cycle described above, may be carried out by the on-board system on the vehicle of interest $O_1$ in order to predict the points $P_k(2)$ occupied by each of the K vehicles in the set at a second prediction instant $t_2$ separated from the first instant $t_1$ by the time step $\Delta t$, that is to say in order to estimate a second relative position $\{X; Y; \theta\}_{k,2}$ and a second relative speed $\{V_X; V_Y; \dot\theta\}_{k,2}$ of each vehicle $O_k$ in said set, in said first frame of reference and for the second prediction instant. For this purpose, the second prediction cycle comprises:

a first step of updating the database, in which the initial relative position and relative speed data are replaced by the first relative position $\{X; Y; \theta\}_{k,1}$ and the first relative speed $\{V_X; V_Y; \dot\theta\}_{k,1}$ which are predicted in the first prediction cycle for each vehicle $O_k$ in the set; and the sorting step 130, the selection step 140 and the sub-steps 150-170 of the first prediction cycle, in which the initial instant $t_0$ has been replaced by the first prediction instant $t_1$, and the first prediction instant $t_1$ has been replaced by the second prediction instant $t_2$.

By generalizing the preceding principles, provision may be made for completing the method with a number N, which is greater than 2, of successive prediction cycles, each $n^{th}$ prediction cycle making it possible to predict an $n^{th}$ relative position $\{X; Y; \theta\}_{k,n}$ and an $n^{th}$ relative speed $\{V_X; V_Y; \dot\theta\}_{k,n}$ of each vehicle $O_k$ in the initial set, in the first frame of reference linked to the vehicle of interest and for an $n^{th}$ prediction instant $t_0$ following a preceding prediction instant $t_{n-1}$ every $n^{th}$ prediction cycle then comprising:

a step of updating the database, in which the initial relative position and relative speed data are replaced by the relative position $\{X; Y; \theta\}_{k,n-1}$ and the relative speed $\{V_X; V_Y; \dot\theta\}_{k,n-1}$ which are predicted in the preceding prediction cycle for each vehicle $O_k$ in the set; and the sorting step 130, the selection step 140 and the sub-steps 150-170 of the first prediction cycle, in which the initial instant $t_0$ has been replaced by the preceding prediction instant $t_{n-1}$, and the first prediction instant has been replaced by the $n^{th}$ prediction instant $t_n$.

The invention claimed is:

1. A driver-assistance method for a motor vehicle of interest, comprising:

a detection step during which an on-board system on said motor vehicle of interest detects a plurality of third-party vehicles which are present at an initial instant in the environment of the motor vehicle of interest, in a multi-lane travel zone;

a first cycle of prediction, by said on-board system, of a first relative position and of a first relative speed of each vehicle $O_k$ in a set of K vehicles comprising the third-party vehicles which are detected at the initial instant and the vehicle of interest, in a first frame of reference linked to the vehicle of interest and for a first prediction instant following said initial instant, said first prediction cycle comprising:

storing, in a database of said on-board system, initial data for each vehicle $O_k$ in said set, said initial data comprising information relating to the current traffic lane, a current relative position and a current relative speed of each vehicle $O_k$ in said set at the initial instant and in said first frame of reference;

sorting, during which an order of priority is assigned to the K vehicles $O_k$ in the set, the order of priority being determined in accordance with the position and with the traffic lane of each vehicle $O_k$ in the set which are stored in the database, wherein the order of priority increases with increasing distance from the vehicle of interest;

selecting each vehicle $O_k$ in said set in the predetermined order of priority;

identifying, for each selected vehicle $O*_k$, another vehicle in said set which is able to be a primary target vehicle for the selected vehicle $O*_k$;

estimating, for each selected vehicle $O*_k$, a manoeuvre which is in progress or about to be performed by the selected vehicle $O*_k$ on the basis at least of the identified primary target vehicle, of information relating only to the selected vehicle $O*_k$ and of information relating to the current environment of the selected vehicle $O*_k$;

estimating, for each selected vehicle $O*_k$, a movement of the selected vehicle $O*_k$ between the initial instant and said first prediction instant on the basis of the manoeuvre which is estimated for the selected vehicle $O*_k$;

wherein the first relative position and the first relative speed of the selected vehicle $O*_k$ for said first prediction instant is predicted on the basis of the estimated movement;

wherein identifying the primary target vehicle, estimating the manoeuvre, and estimating the movement is performed relative to a two-dimensional frame of reference in which the selected vehicle $O*_k$ is stationary.

2. The method according to claim 1, wherein the estimated manoeuvre is chosen from a predefined set of possible manoeuvres.

3. The method according to claim 2, wherein the predefined set of possible manoeuvres for a selected vehicle $O^*_k$ comprises:
   keeping the selected vehicle in a current lane;
   changing the selected vehicle lane to the left lane;
   changing the selected vehicle lane to the right lane;
   stopping the selected vehicle in the current lane.

4. The method according to claim 1, wherein, identifying a potential primary target vehicle for the selected vehicle $O^*_k$ comprises searching for a vehicle in the set located in the same lane, ahead of and closest to the selected vehicle $O^*_k$.

5. The method according to claim 1, wherein the information relating only to the selected vehicle $O^*_k$ comprises a sideways movement, and/or an on or off state of one of its indicators, and/or a history of its stored positions.

6. The method according to claim 1, wherein the information relating to the current environment of the selected vehicle $O^*_k$ comprises the type of marking lines of the traffic lane in which the selected vehicle $O^*_k$ is located and/or the occupancy of the traffic lanes which are adjacent to the current traffic lane of the selected vehicle $O^*_k$, and/or the current speed limit assigned to the traffic lane.

7. The method according to claim 1, further comprising:
   a second cycle of prediction, by said on-board system, of a second relative position and of a second relative speed of each vehicle $O_k$ in said set, in said first frame of reference and for a second prediction instant following said first prediction instant, the second prediction cycle comprising:
   updating the database, in which the initial relative position and relative speed data are replaced by the first relative position and the first relative speed which are predicted in the first prediction cycle for each vehicle $O_k$ in the set;
   the sorting, the selecting, the identifying, the estimating a manoeuvre, and the estimating a movement of the first prediction cycle, in which the initial instant has been replaced by the first prediction instant, and the first prediction instant has been replaced by the second prediction instant.

8. The method according to claim 7, further comprising:
   a number N, which is greater than 2, of successive prediction cycles, each $n^{th}$ prediction cycle making it possible to predict an $n^{th}$ relative position and an $n^{th}$ relative speed of each vehicle $O_k$ in said set, in said first frame of reference and for an $n^{th}$ prediction instant following a preceding prediction instant, each $n^{th}$ prediction cycle comprising:
   updating the database, in which the relative position and relative speed data are replaced by the relative position and the relative speed which are predicted in the preceding prediction cycle for each vehicle $O_k$ in the set; and
   the sorting, the selecting, the identifying, the estimating a manoeuvre, and the estimating a movement of the first prediction cycle, in which the initial instant has been replaced by the preceding prediction instant, and the first prediction instant has been replaced by the $n^{th}$ prediction instant.

9. The method according to claim 8, wherein the successive prediction instants are separated by a constant time step.

10. The method according to claim 9, in which N is equal to 33 and the constant time step is equal to 200 ms.

11. An on-board driver-assistance system on a vehicle of interest, configured to implement the method according to claim 1.

* * * * *